US012700136B2

(12) United States Patent
Polakevich et al.

(10) Patent No.: US 12,700,136 B2
(45) Date of Patent: Aug. 4, 2026

(54) GARMENT PALLETIZATION

(71) Applicant: Kornit Digital Ltd., Rosh HaAyin (IL)

(72) Inventors: Alon Polakevich, Pardes Hanna (IL); Meir Warulker, Rosh HaAyin (IL); Nadav Mordechai, Tel Aviv (IL); Ohad Snir, Kiryat-Ono (IL); Avi Feinschmidt, Holon (IL); Alon Yasovsky, Herzlia (IL); Harel Yizhak, Rehovot (IL); Dor Shlomo Ben David, Shoham (IL); Eduard Bendeiski, Petah Tikva (IL)

(73) Assignee: Kornit Digital Ltd., Rosh HaAyin (IL)

( * ) Notice: Subject to any disclaimer, the term of this patent is extended or adjusted under 35 U.S.C. 154(b) by 285 days.

(21) Appl. No.: 18/561,300

(22) PCT Filed: May 16, 2022

(86) PCT No.: PCT/IL2022/050510
§ 371 (c)(1),
(2) Date: Nov. 16, 2023

(87) PCT Pub. No.: WO2022/243997
PCT Pub. Date: Nov. 24, 2022

(65) Prior Publication Data
US 2024/0257393 A1 Aug. 1, 2024

Related U.S. Application Data

(60) Provisional application No. 63/189,179, filed on May 16, 2021.

(51) Int. Cl.
*G06T 7/73* (2017.01)
*G06T 7/00* (2017.01)

(52) U.S. Cl.
CPC ................ *G06T 7/74* (2017.01); *G06T 7/001* (2013.01); *G06T 2207/10024* (2013.01); *G06T 2207/30144* (2013.01)

(58) Field of Classification Search
CPC .. G06T 7/74; G06T 7/001; G06T 2207/30144
See application file for complete search history.

(56) References Cited

U.S. PATENT DOCUMENTS 4,846,058 A * 7/1989 Farris ...................... B41M 1/12
101/DIG. 36
6,439,370 B1 8/2002 Hoffman, Jr. et al.
(Continued)

FOREIGN PATENT DOCUMENTS

| CN | 206591258 | 10/2017 |
| CN | 108363879 | 8/2018 |
| WO | WO 2022/243997 | 11/2022 |

OTHER PUBLICATIONS

International Preliminary Report on Patentability Dated Nov. 30, 2023 From the International Bureau of WIPO Re. Application No. PCT/IL2022/050510 (7 Pages).
(Continued)

*Primary Examiner* — Ian L Lemieux

(57) ABSTRACT

Palletization apparatus for loading a garment onto a pallet for processing comprises a form pallet, having an upper surface and a form collar, and an imaging device that views the pallet and the collar area. The garment meanwhile has a neckline or collar. The imaging device is connected to an image processor and the image processor identifies the region around the form collar and the garment neckline or collar and determines firstly that the garment is present, and then secondly that the garment neckline or collar is symmetrically placed in relation to the form collar, thereby to provide an indication of correct placement of the garment on the form pallet.

26 Claims, 15 Drawing Sheets

(56) References Cited

U.S. PATENT DOCUMENTS

| | | | | |
|---|---|---|---|---|
| 7,040,748 | B2 * | 5/2006 | Niimi | B41J 11/06 |
| | | | | 101/474 |
| 9,025,196 | B2 * | 5/2015 | Moriya | B41J 3/4078 |
| | | | | 101/129 |
| 10,607,411 | B1 | 3/2020 | Pezzino et al. | |
| 2009/0034012 | A1 * | 2/2009 | Northup | A41B 1/08 |
| | | | | 358/3.29 |
| 2009/0056582 | A1 * | 3/2009 | Mizutani | B41J 3/4078 |
| | | | | 101/484 |
| 2012/0250946 | A1 * | 10/2012 | Kitagawa | G06T 1/0007 |
| | | | | 382/111 |
| 2017/0072703 | A1 | 3/2017 | Davison et al. | |
| 2017/0106673 | A1 * | 4/2017 | Fujimori | B41J 11/58 |
| 2018/0333949 | A1 * | 11/2018 | Edwards | B41F 17/005 |
| 2019/0381808 | A1 * | 12/2019 | Friedrich | B41J 11/20 |
| 2020/0160430 | A1 * | 5/2020 | Lamoureux | A41H 1/02 |
| 2020/0307277 | A1 | 10/2020 | Snir | |
| 2021/0162775 | A1 * | 6/2021 | Kayahara | B41F 17/38 |
| 2021/0364998 | A1 * | 11/2021 | Boehm, Jr. et al. | G06T 7/0004 |
| 2022/0180558 | A1 * | 6/2022 | Takasu | B41J 29/38 |
| 2022/0212462 | A1 * | 7/2022 | Friedrich | B41J 11/002 |
| 2023/0150276 | A1 * | 5/2023 | Mano | B65H 5/08 |
| | | | | 101/407.1 |

OTHER PUBLICATIONS

International Search Report and the Written Opinion Dated Nov. 16, 2022 From the International Searching Authority Re. Application No. PCT/IL2022/050510. (12 Pages).

Notification of Office Action and Search Report Dated Aug. 6, 2025 From the State Intellectual Property Office of the People's Republic of China Re. Application No. 202280034681.6 with Its Summary and Machine Translation of Office Action into English. (21 Pages).

Supplementary European Search Report and the European Search Opinion Dated Feb. 19, 2025 From the European Patent Office Re. Application No. 22804196.8. (7 Pages).

* cited by examiner

Fig. 2

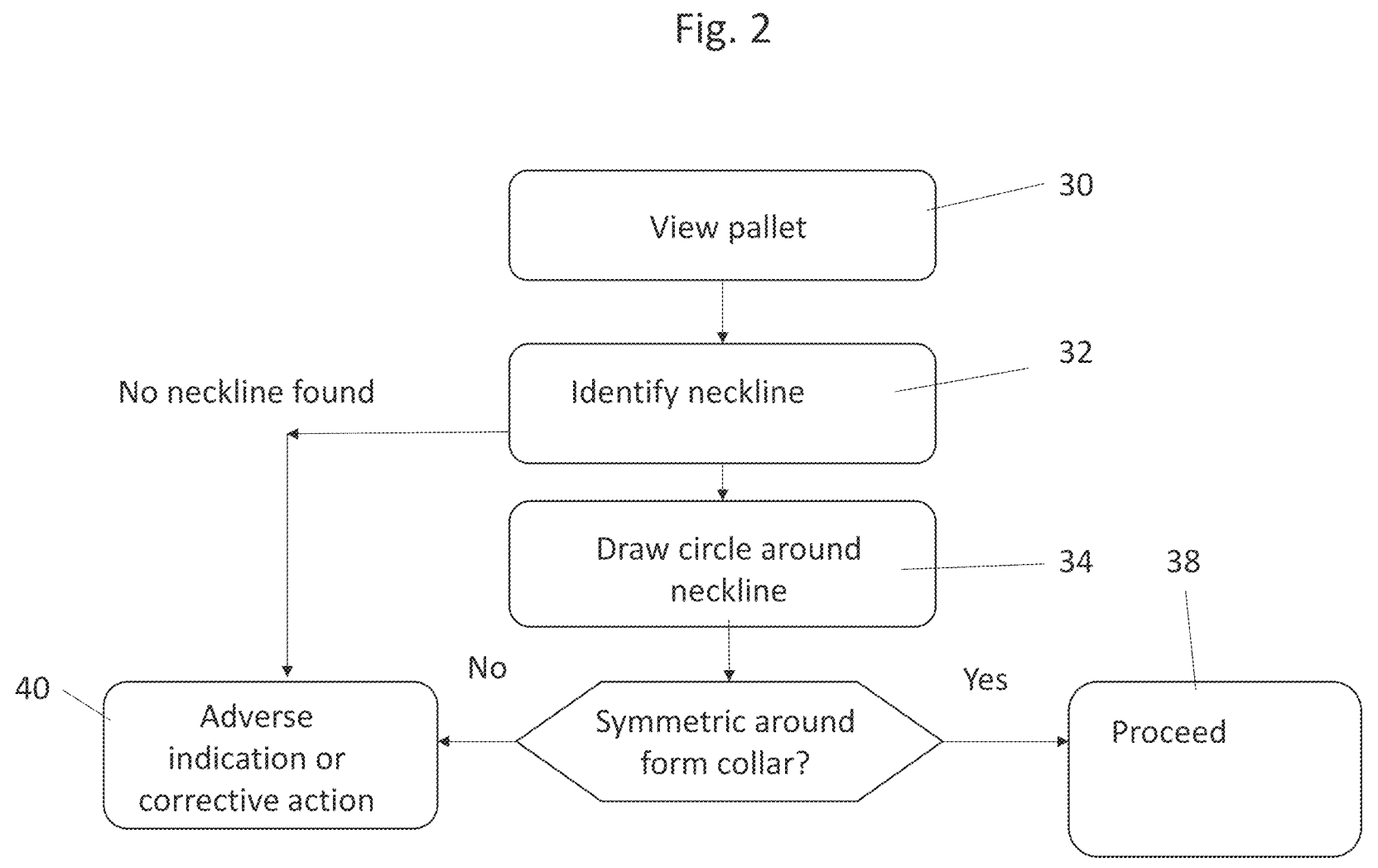

30 — View pallet

32 — Identify neckline

34 — Draw circle around neckline

No neckline found

Symmetric around form collar?

Yes — 38 — Proceed

No

40 — Adverse indication or corrective action

Fig. 3

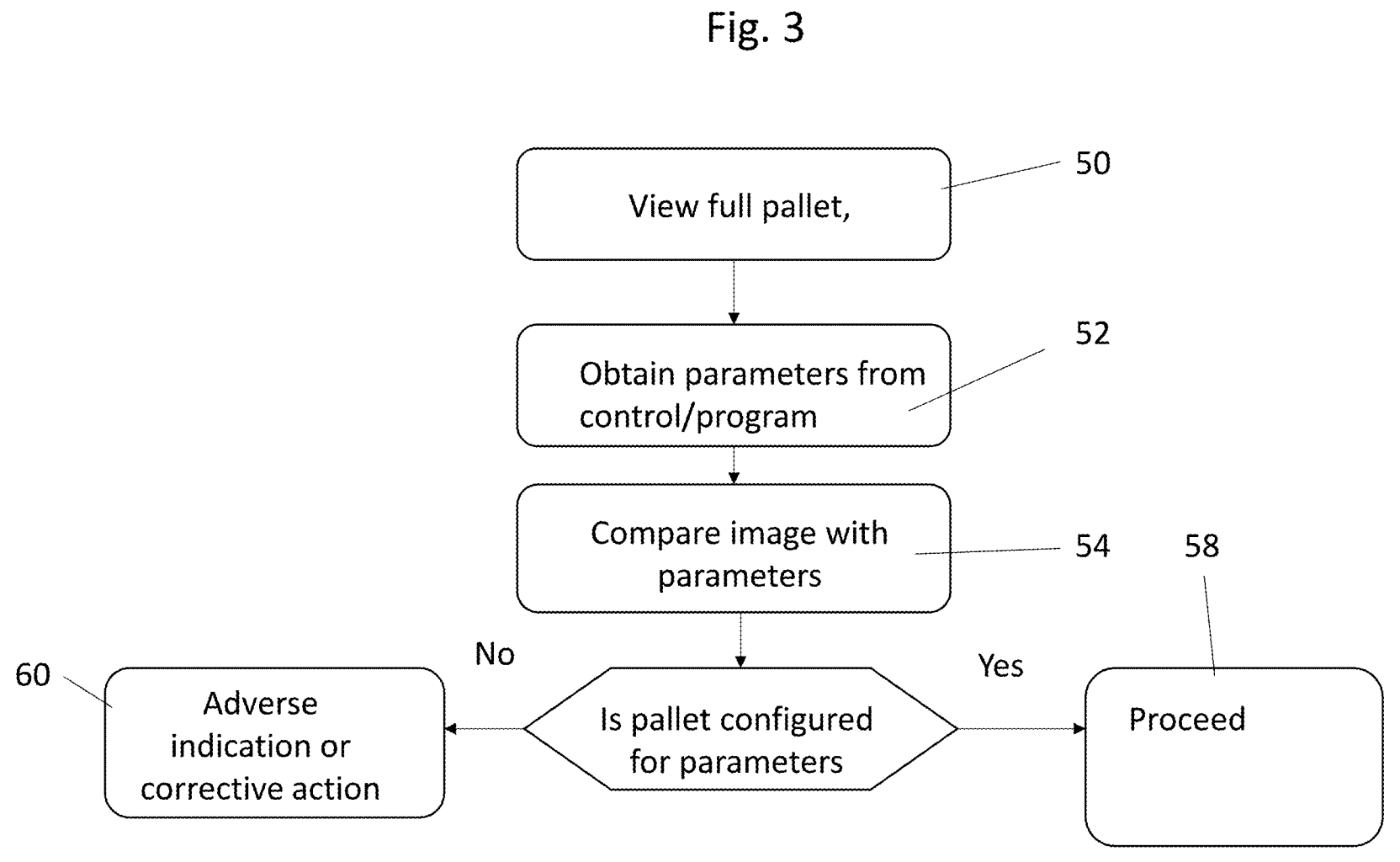

50
View full pallet,

52
Obtain parameters from control/program

54
Compare image with parameters

Is pallet configured for parameters

Yes

No

58
Proceed

60
Adverse indication or corrective action

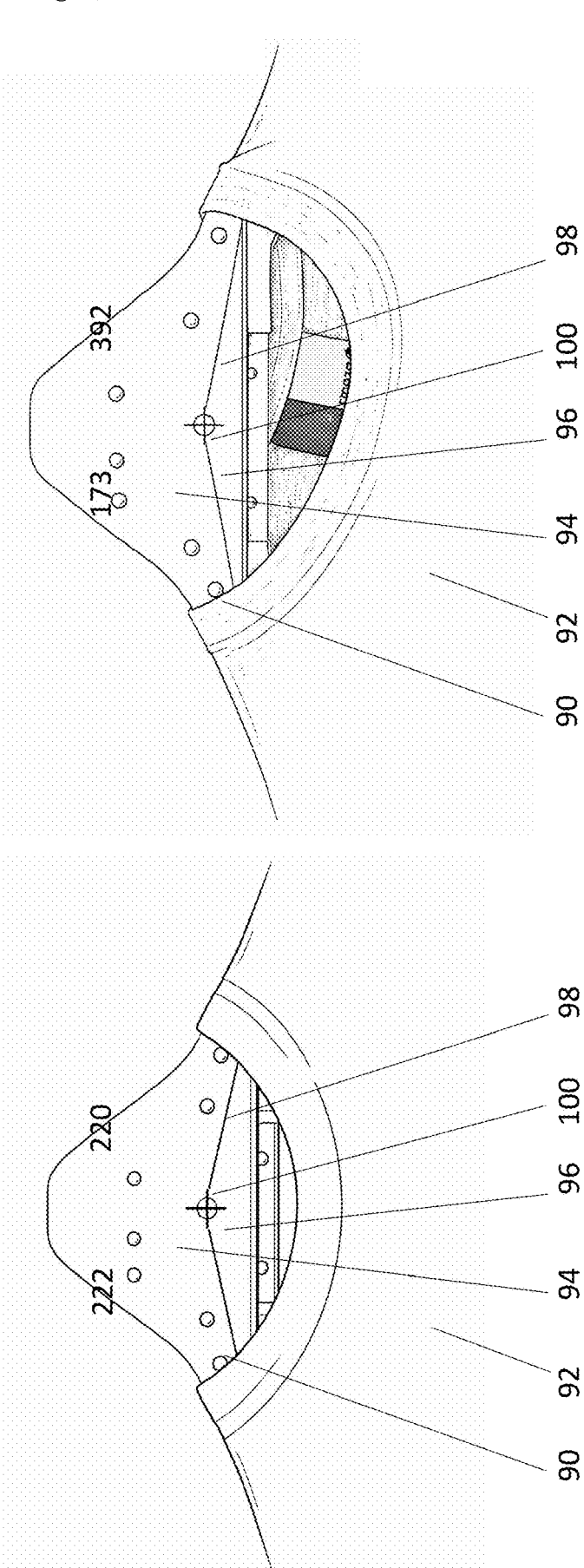

104

102

90

92

Clear outlines
around pallet parts
222

Pallets parts

Figure 16:
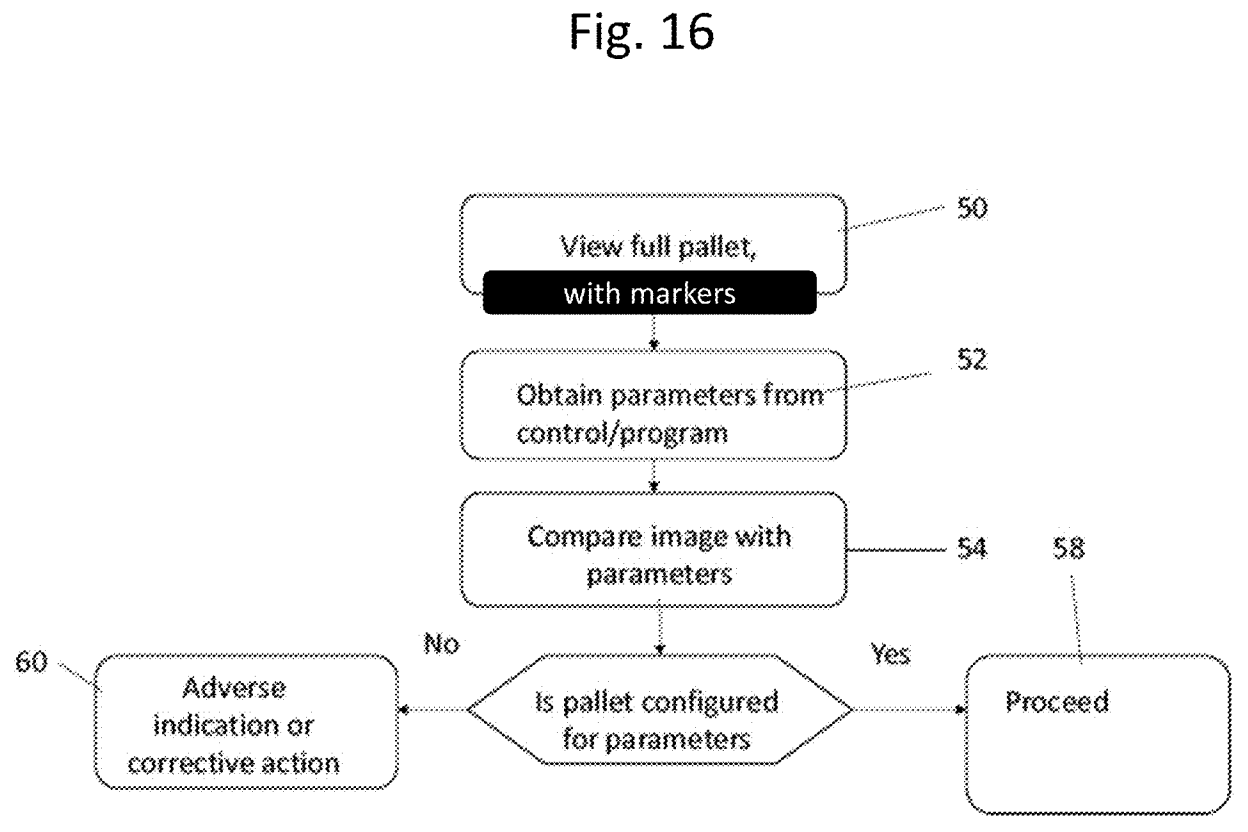

50 — View full pallet, with markers

52 — Obtain parameters from control/program

54 — Compare image with parameters

Is pallet configured for parameters

Yes → 58 — Proceed

No → 60 — Adverse indication or corrective action

GARMENT PALLETIZATION

RELATED APPLICATIONS

This application is a National Phase of PCT Patent Application No. PCT/IL2022/050510 having International filing date of May 16, 2022, which claims the benefit under 35 USC § 119(e) of priority of U.S. Provisional Patent Application No. 63/189,179 filed on May 16, 2021. The contents of the above applications are all incorporated by reference as if fully set forth herein in their entirety.

FIELD AND BACKGROUND OF THE INVENTION

The present invention, in some embodiments thereof, relates to garment palletization, or the placing of garments on pallets for processing, for example printing and, more particularly, but not exclusively, to the use of visual processing before and after the printing process, to enhance automation of the palletization process and ensure quality and correct prints, respectively.

Regarding automation of the palletization process, copending International patent application No. IL2021/050379 to the present owners relates to the issue of symmetrical picking up of a garment so that the garment may subsequently be pulled over the pallet. Therein is disclosed a garment printer having a pallet or tray on which the garment is carried through the printer. In the past, feeding would involve an operator placing the garment for printing on the pallet. However, there is often little time for an operator to smooth out a garment on the pallet. Often a time budget of nine or even fewer seconds is all that is provided for placing the garment in position. In more recent technology, an automatic gripper has been provided which takes up the garment from the rear of the pallet and pulls the garment across the pallet. The operator has the simpler task of placing the garment symmetrically in or in front of the gripper.

The garment gripper operates as an industrial robot or Cobot and, like the human operator, has very little time to place the garment on the tray. The robot or Cobot is typically fed the garment, whether from a pile of garments at the side or from a human operator and provided the gripper grips the garment at symmetrical locations, the garment will be taken up evenly onto the pallet. If the garment is not placed symmetrically and smoothly on the pallet, then the print will be crooked. In a typical case, the operator has about two seconds to make any adjustments once the gripper has placed the garment on the pallet. Detecting asymmetry is something the human eye is good at, so that a very slight change in distribution of area can be easily spotted by the human eye if it leads to asymmetry, but is much more difficult for machine vision to detect.

The camera and the reference markers however are of no assistance in assessing how well the garment sits on the pallet after placement, or even whether the pallet has been set up correctly for the garment.

Applicant's copending U.S. Provisional Application No. 63/035,782 filed Jun. 7, 2020, relates to a modular pallet in which parts may be added or removed to accommodate different sizes, shapes or kinds of garments.

Applicant's U.S. Pat. No. 10,744,799 filed Aug. 2, 2016, relates to a pallet with rotating flaps on either side that close over the garment once placed on the pallet.

SUMMARY OF THE INVENTION

The present embodiments use visual processing to assess that the pallet and the garment are suitably set up for printing or other processes. The collar area is a part of the garment that is readily identifiable to artificial intelligence and the garment collar may be compared to the pallet collar and/or reference markers to ensure a relationship of symmetry between them. Other features may be checked, such as the size and configuration of the pallet, the size, color and design of the garment, and whether or not the processing area on the garment is clear and smooth.

According to an aspect of some embodiments of the present invention there is provided palletization apparatus for loading a garment onto a pallet for processing, the apparatus comprising a form pallet, which may be configurable, the form pallet having an upper surface and a form collar, for example with indication reference markers, and the garment having a neckline or collar, the apparatus further comprising an imaging device and an image processor, the imaging device being located in relation to the pallet or pallets, to have a view of the pallet and garment, including a region around the form collar, the imaging device being connected to an image processor and the image processor being configured to identify the pallet set up, the region around the form collar and the garment neckline or collar and to distinguish presence and symmetrical placement of the garment in relation to the form pallert, thereby to provide an indication of the pallet set up, the garment characteristics, and correct placement of the garment on the form pallet. For example the image processing may ascertain whether the garment is centrally located on the pallet, whether the neckline or collar is correctly aligned and indeed whether the garment and pallet match. For example has a large size garment been placed on a pallet configured for a small size?

In embodiments, the image processor is configured to delimit a virtual circle around the neckline or garment collar and to determine how the circle is positioned in relation to the form collar.

Embodiments may comprise grippers for holding the garment and pulling the garment onto the form pallet, the grippers being controllable for adjustment of the garment to adjust the placement and the rotation of the garment with reference to the pallet.

In embodiments, the image processor is further configured to compare a garment on the pallet to a predetermined configuration, to ensure a match between the garment and a predetermined processing program.

In embodiments, the processing is digital printing or alternatively screen printing.

In embodiments, the predetermined processing program comprises a print map for a given size and/or color and/or shape and/or knit or woven type of garment and the image processor is configured to confirm that a garment on the pallet conforms with the given size and/or color and/or shape and/or knit or woven type.

In embodiments, the predetermined processing program comprises a pre-printing process for color printing on a colored background, and the image processor is configured to confirm that a garment on the pallet is of the correct color within the allowed tolerance.

In embodiments, the predetermined processing program is for a garment of a given size within preset manufacturer's tolerances, and the image processor is configured to confirm that a garment on the pallet is of the given size within the allowed tolerances.

In embodiments, the predetermined processing program is designed for a garment having a specified distribution of discontinuities within a print area, and the image processor is configured to confirm that a garment on the pallet conforms to the specified distribution of discontinuities.

In embodiments, the form pallet is configurable or exchangeable for different configurations and garments and the image processor is configured to confirm that a current configuration and pallet size is compatible with the predetermined processing program.

In embodiments, the image processor is configured to compare a neckline or garment collar to an expected neckline or garment collar to verify that a garment is orientated on the pallet in accordance with the predetermined processing program, thereby to process an intended side of the garment, and not printing the image upside down for example.

In embodiments, the image processor is configured to compare a neckline or garment stiches to an expected neckline or garment stiches to verify that a garment is placed on the pallet in accordance with the predetermined processing program, thereby to process an intended side of the garment and not inside out.

In embodiments, the image processor is configured to verify that a processing area of the garment is free of garment appendages.

In embodiments, the image processor is configured to verify that a processing area of the garment is free of wrinkles.

In embodiments, the image processor is configured to compare garments after printing with an expected result, a respective predetermined processing program verifying that the process has been applied successfully to a respective garment.

In embodiments, the imaging device is one member of the group consisting of a camera, a laser and a LIDAR device.

According to a second aspect of the present invention there is provided a palletization method for loading a garment onto a pallet for processing, the method using a form pallet, the form pallet having an upper surface and a form collar with indication markers, and the garment having a neckline or collar, the method further comprising:

imaging the pallet to take a view of a region around the form collar;

identifying from the view, the region around the form collar and the garment neckline or collar with respect to the indication markers;

from the view determining that the garment is present; and if the garment is present then distinguishing symmetrical placement of the neckline or garment collar in relation to the form collar, thereby to provide an indication of correct placement of the garment on the form pallet.

The method may comprise delimiting a circle around the neckline or garment collar and determining how the circle is positioned in relation to the form collar and indication markers.

The method may comprise using grippers for adjustment of the garment to adjust the placement of the garment.

The method may comprise software notifications and instructions for manual adjustment of the garment to adjust the placement of the garment by the operator.

The method may comprise using software processing for adjustment of the image to adjust the position and angle of the image on the garment, before printing it, to the correct placement.

The method may comprise comparing a garment's characteristics such as size, color, type, shape, on the pallet to a predetermined configuration, to ensure a match between the garment and a predetermined processing program.

In the method, the processing is digital printing and/or screen printing.

The method may comprise comparing a garment on the pallet to a preset size and/or color and/or shape and/or knit or woven type.

In the method, a predetermined process may be for color printing on a colored background, and the method may thus comprise confirming that a garment on the pallet is colored.

In the method, a predetermined processing program may be for a garment of a given size within preset manufacturer's tolerances, and the method may thus comprise confirming that a garment on the pallet is of the given size within the manufacturer's tolerances.

In the method, a predetermined processing program may be designed for a garment having a specified distribution of discontinuities within a print area, and the method may thus comprise confirming that a garment on the pallet conforms to the specified distribution of discontinuities.

In the method, the form pallet is configurable or exchangeable for different garments, and the method may comprise confirming that a current configuration or pallet size is compatible with the predetermined processing program.

The method may comprise comparing a neckline or garment collar to an expected neckline or garment collar to verify that a garment is orientated on the pallet in accordance with a predetermined processing program, thereby to process an intended side of the garment.

The method may comprise verifying that a processing area of the garment is free of garment appendages.

The method may comprise verifying that a processing area of the garment is free of wrinkles.

The method may comprise comparing garments after printing the entire or each part or layer of the image with a respective predetermined processing program to verify that the process has been applied successfully to a respective garment. The method may comprise reading an indication of the garment type from an attached tag with identification method such as a barcode, RFID, or a QR code to determine the printing job attributes or data and to upload them to the printing processor for the upcoming print.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL
VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 is a simplified flow chart of the procedure for checking that the garment is symmetrically loaded on the pallet according to embodiments of the present invention;

FIG. 3 is a simplified flow chart of the procedure for comparing imaged parameters with expected parameters to ensure that processing may proceed successfully, according to embodiments of the present invention;

Figures 4A, 4B, 4C, 4D:
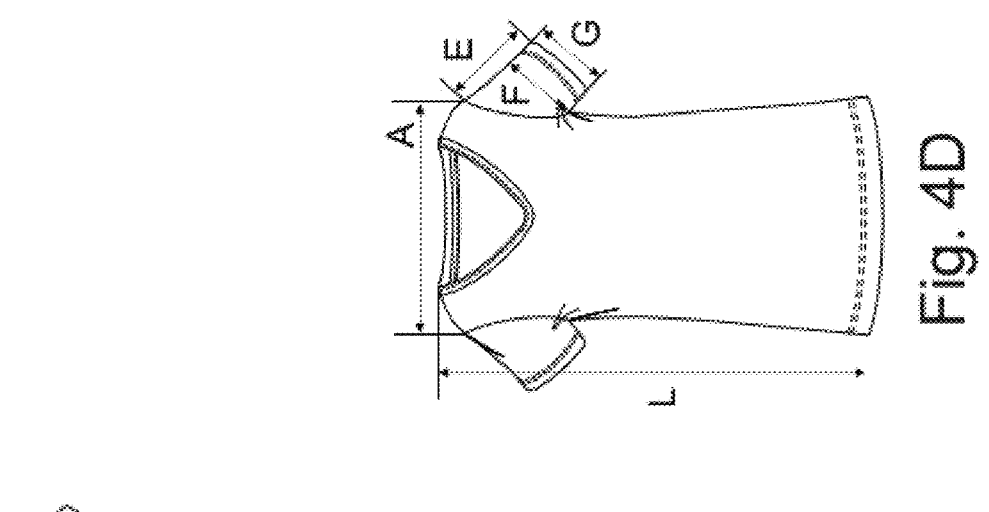
Figure 5:
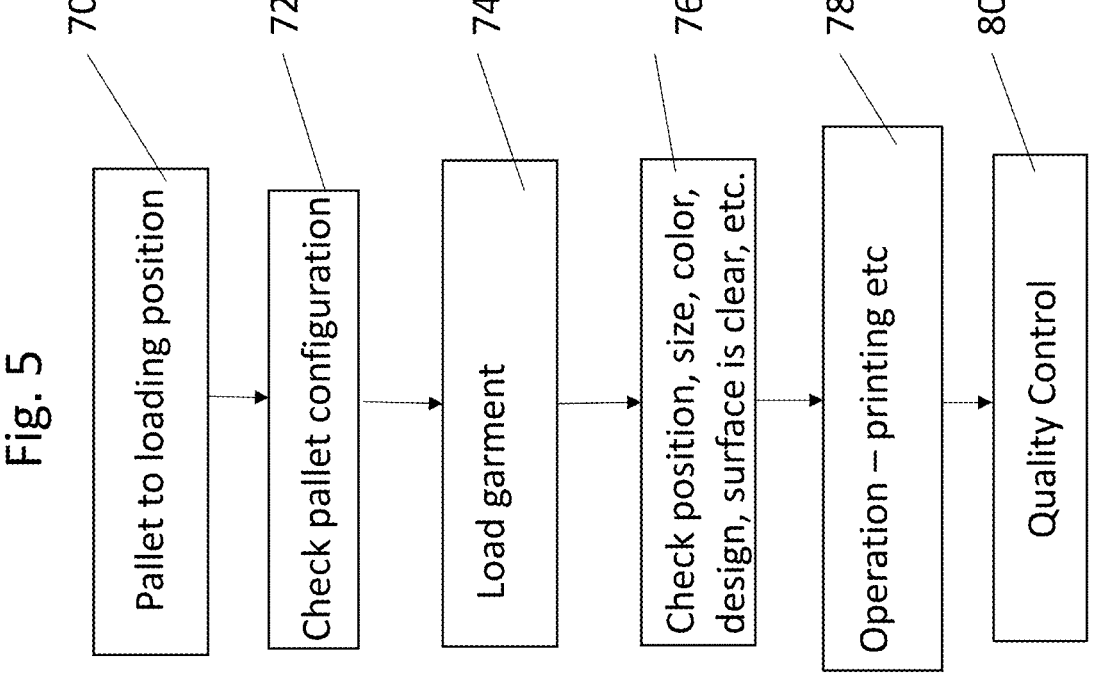

FIGS. 4A-4D show different designs of garments that may be distinguished by the present embodiments and various measurements that may be obtained; and FIG. 5 is a flow chart of an overall process where imaging according to the present embodiments initially checks the pallet configuration, then checks the garment loading and finally does a quality check on the end result, according to embodiments of the present invention.

Figure 9:
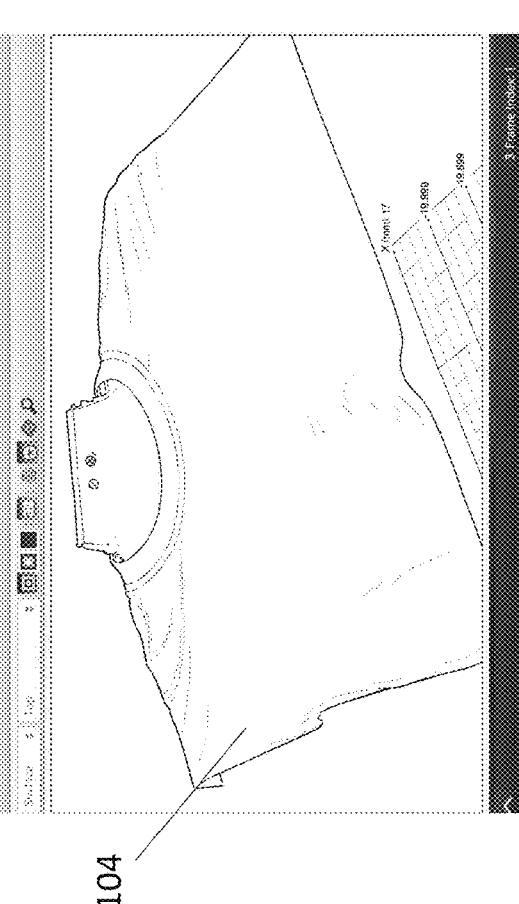
Figure 8:
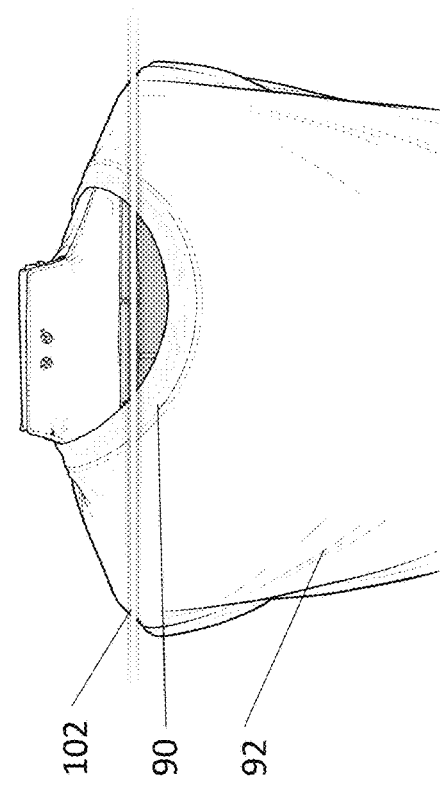
Figure 10A:
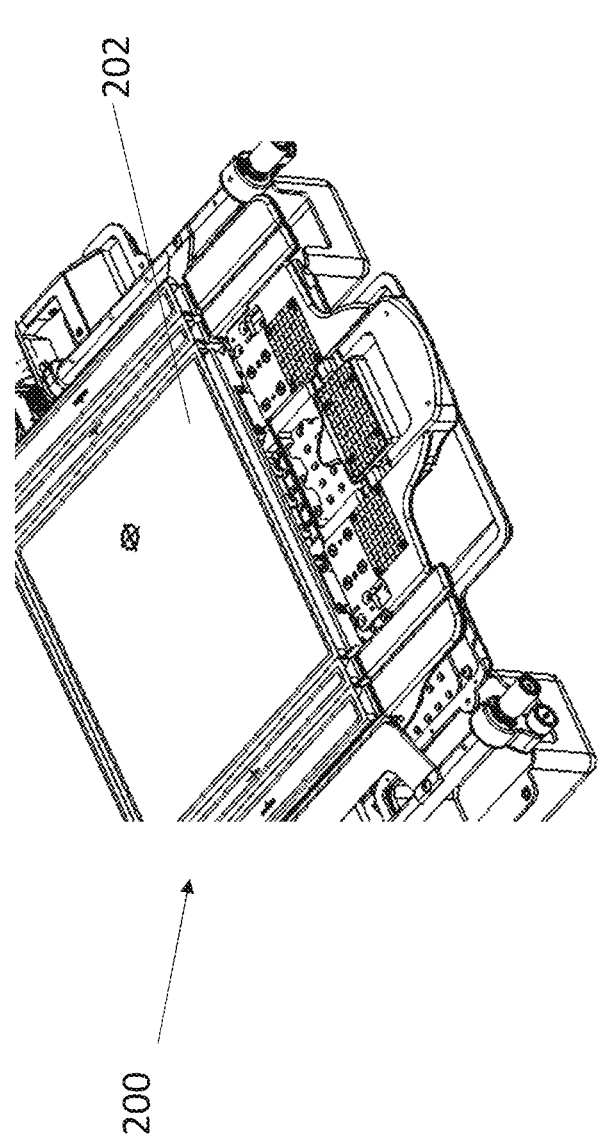
Figures 10B, 10C:
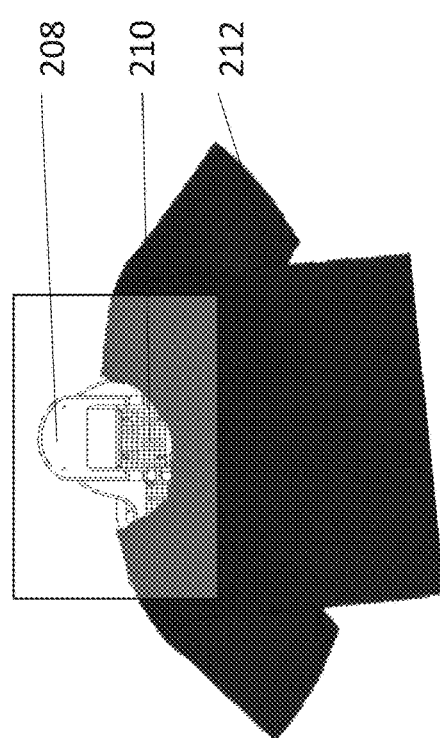
Figure 11:
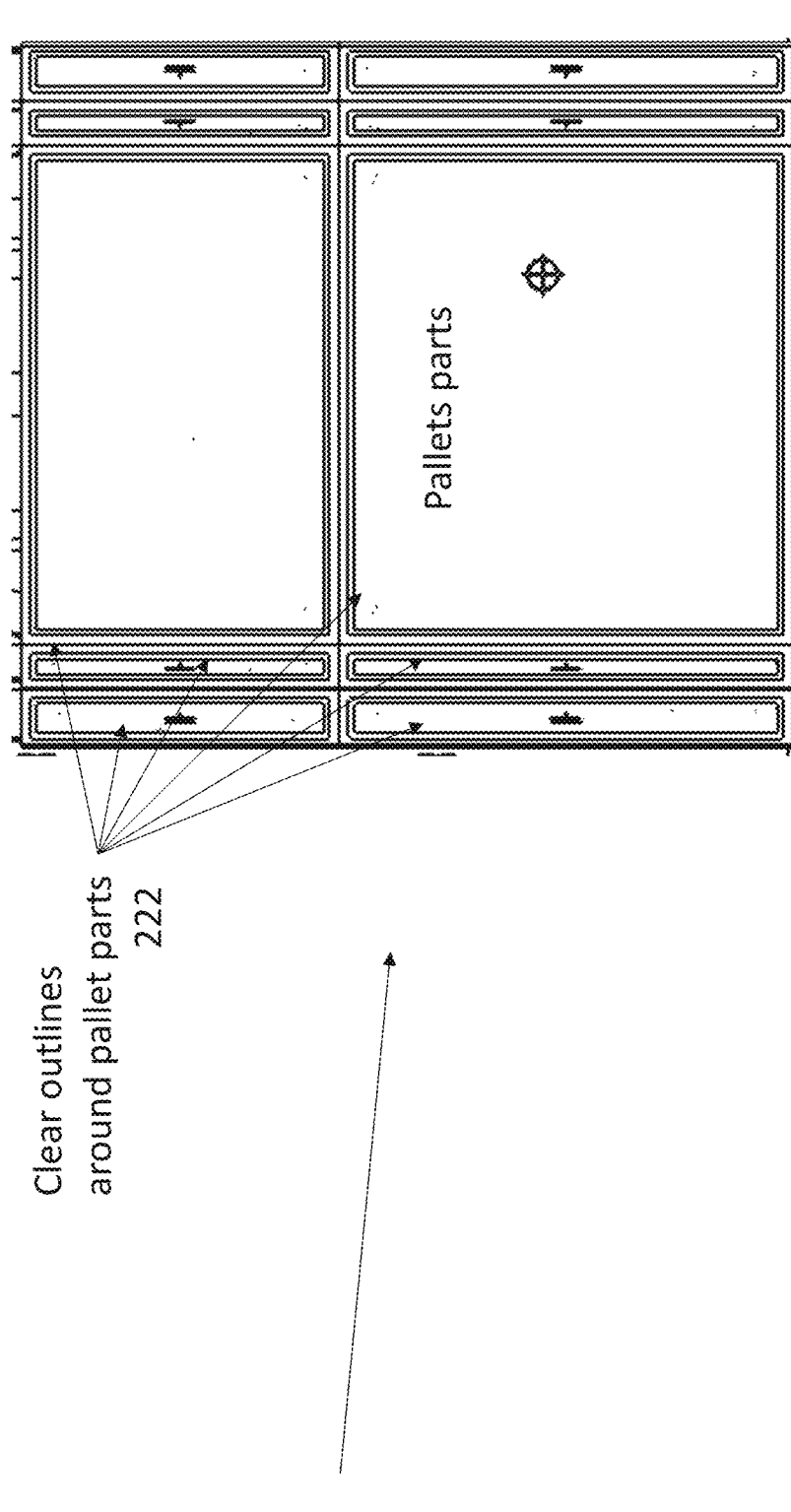
Figures 12A, 12B:
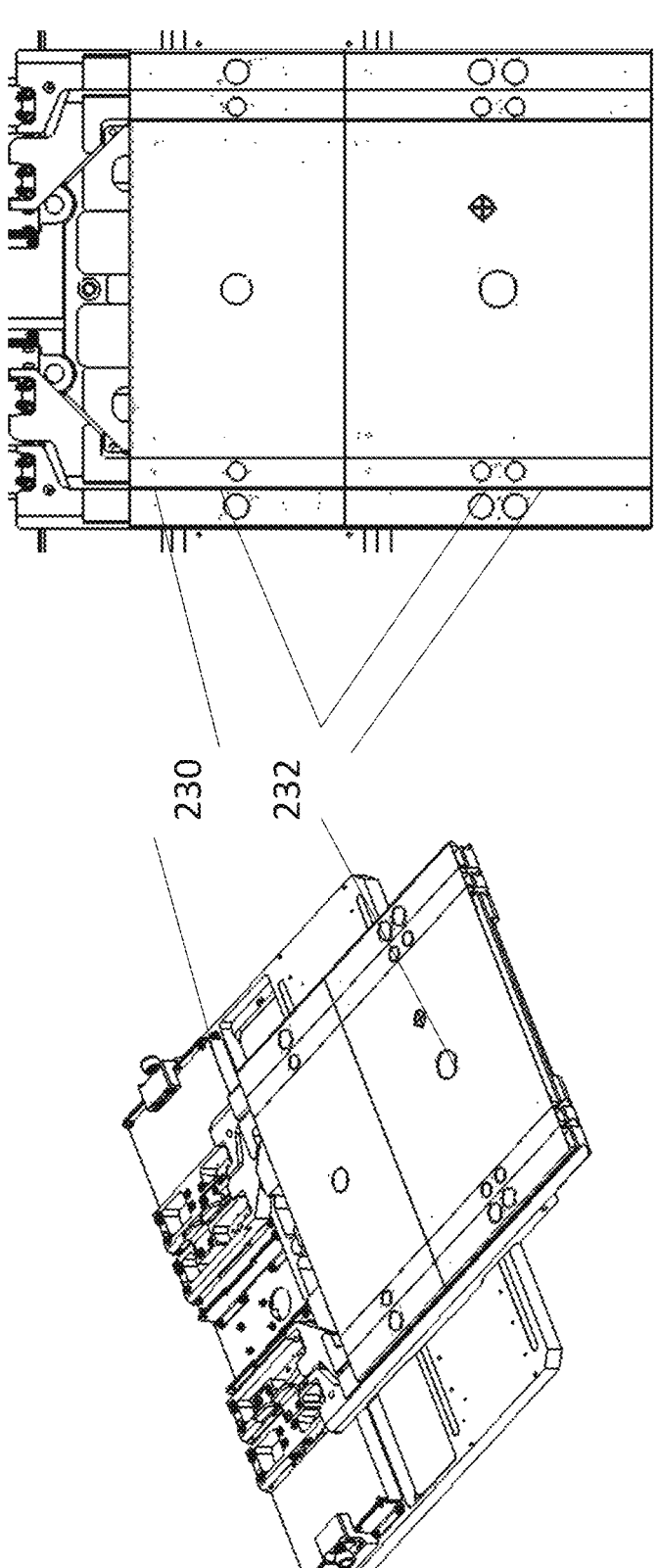

FIG. 6 is an image taken from the imaging device of the present embodiments, and showing measurement of the symmetric position of the garment, the measurement being in numbers of pixels;

FIG. 7 is the same as FIG. 6 but in this case the measurement shows an un-symmetrical loading position of the garment;

FIG. 8 is a simplified illustration of a laser scanning process that scans the garment according to embodiments of the present invention;

FIG. 9 illustrates a result of the scanning of FIG. 8, in which an image is formed to give the position, state of symmetry and thickness of the scanned area;

FIGS. 10A to 10C are three simplified diagrams illustrating the use of reflectors as contrast agents, alone, with correct placement and with incorrect placement respectively, according to embodiments of the present invention;

FIG. 11 illustrates a pallet with pallet parts and clear outlines according to embodiments of the present invention;

FIGS. 12A and 12B are two simplified diagrams illustrating pallets with pallet parts and using varied sizes and patterns of reflectors to indicate the different pallet parts according to an embodiment of the present invention;

Figure 13:
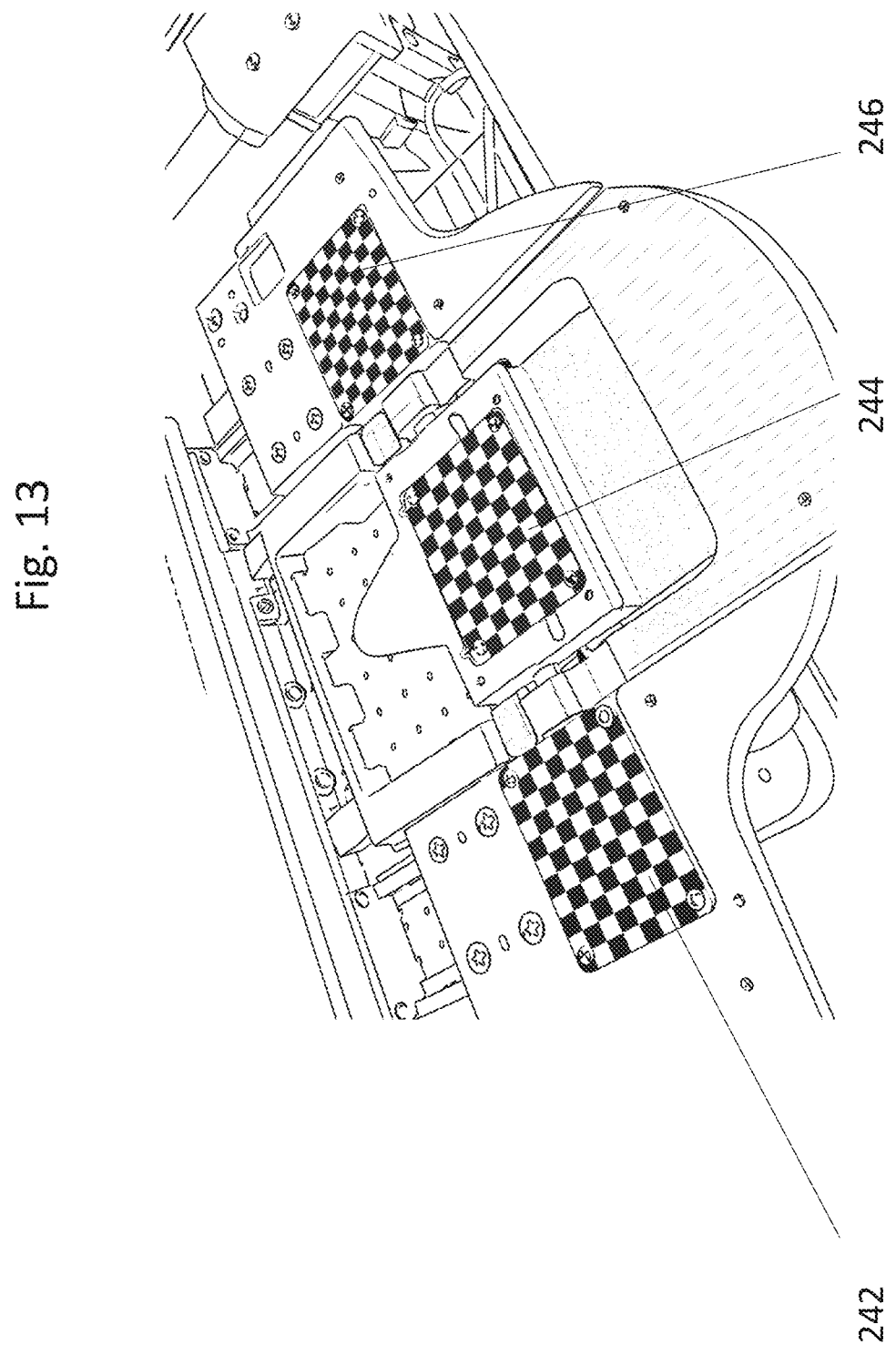

FIG. 13 is a simplified diagram illustrating a pallet with pallet parts and checker patterns on the part surfaces to provide a contrast according to embodiments of the present invention;

Figure 14:
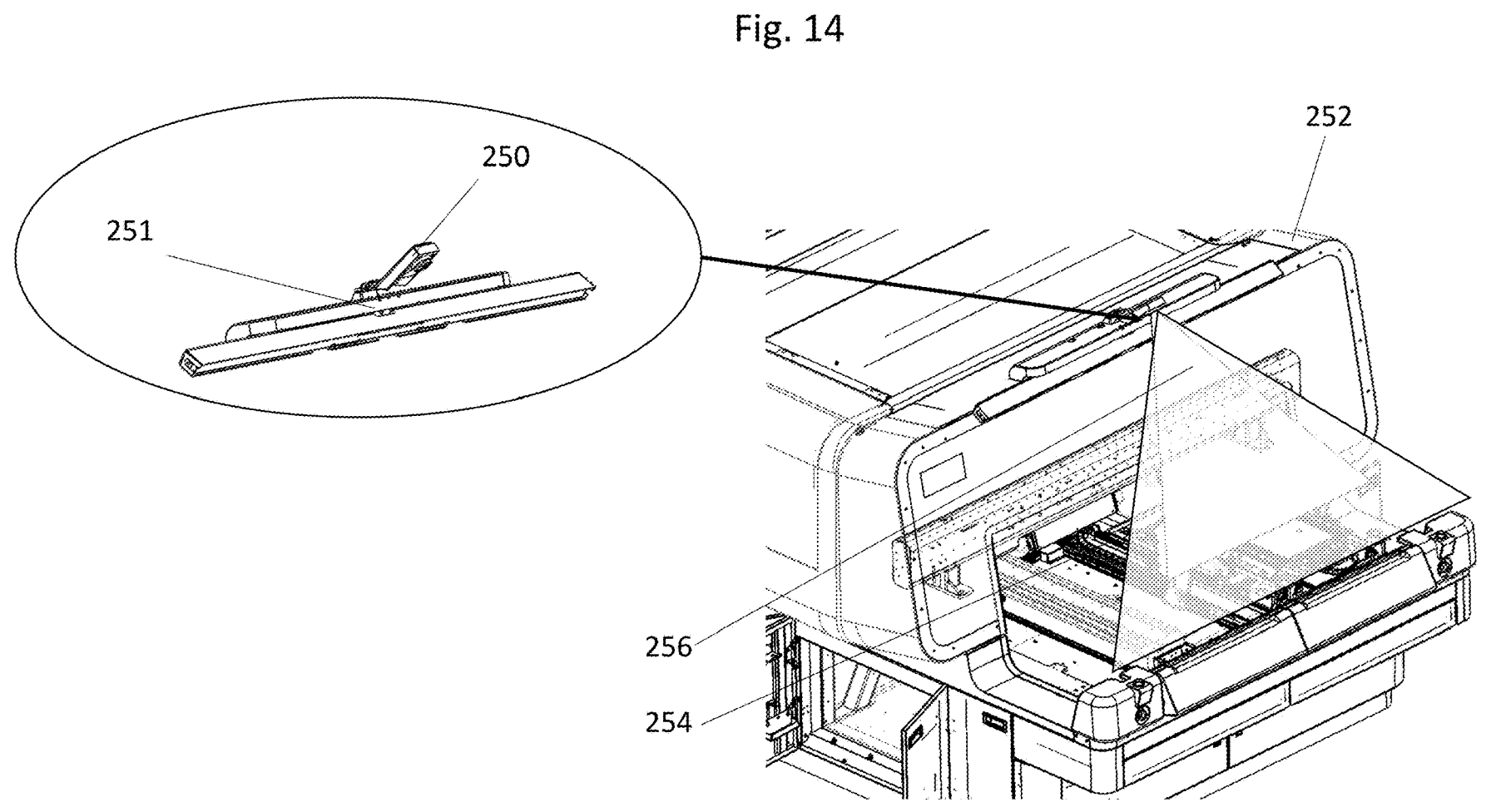

FIG. 14 is a simplified diagram illustrating a camera in position above a pallet to obtain a field of view of the pallet and garment thereon, according to embodiments of the present invention;

Figure 15:
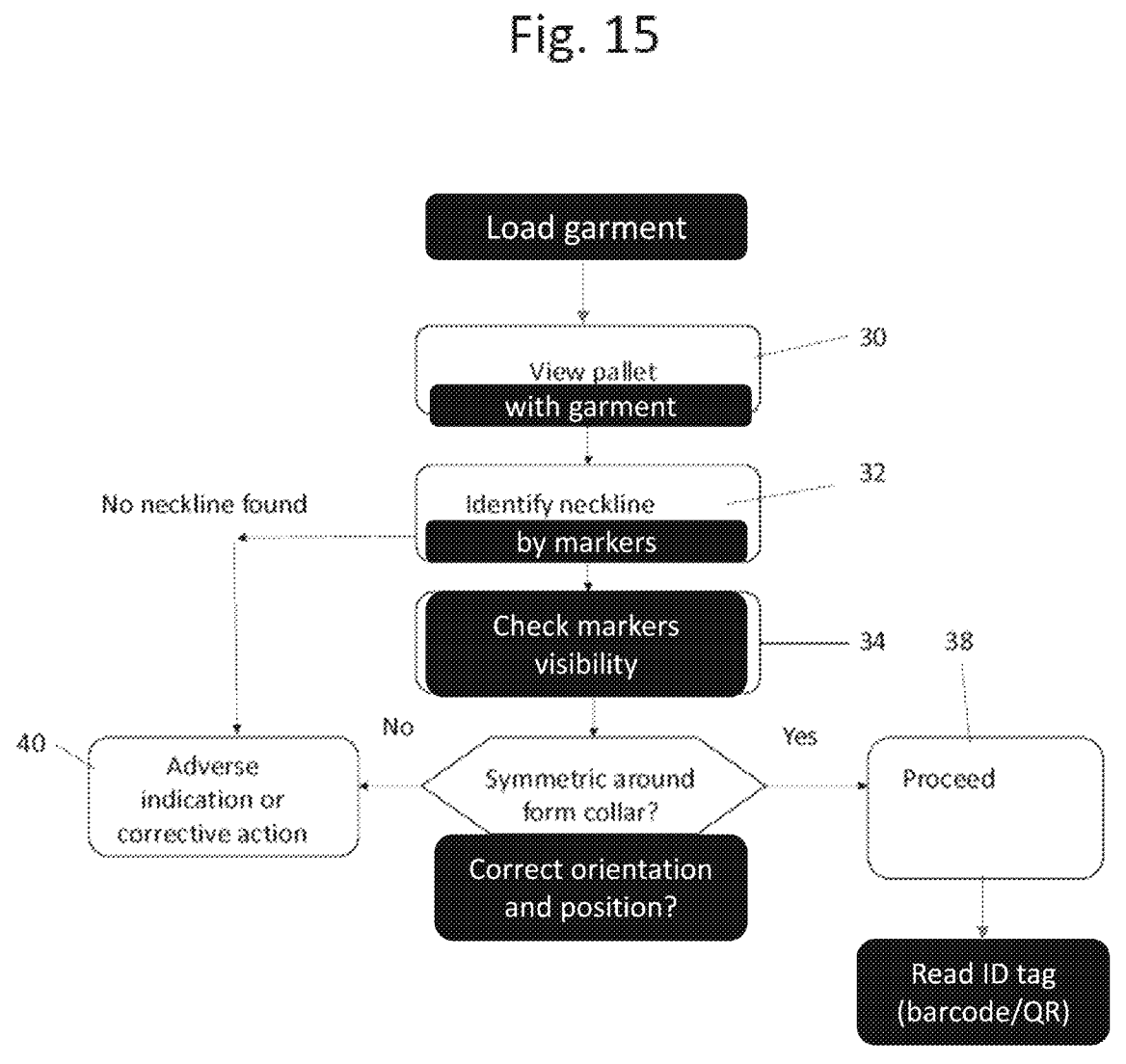

FIG. 15 is a variation of the flow chart of FIG. 2, modified for the use of markers as contrast agents on the pallet; and FIG. 16 is a variation of the flow chart of FIG. 3 modified for the use of markers as contrast agents on the pallet.

DESCRIPTION OF SPECIFIC EMBODIMENTS OF THE INVENTION

As stated in the background section, the present invention, in some embodiments thereof, relates to garment palletization, or the placing of garments on pallets for processing, for example printing and, more particularly, but not exclusively, to use of visual processing to enhance automation of the palletization process.

The present embodiments may provide palletization apparatus that assists with determine the pallet configuration, loading a garment onto a pallet for processing, identify the job ID from an attached tag, and finally determine the process quality. The apparatus comprises a configurable form pallet, having an upper surface and a form collar with identification markers, and an imaging device that views the pallet area, including the collar area. The markers are based on a light reflection pattern that enables the image processor to determine any asymmetry in their appearance or coverage by the garment. The garment meanwhile has a neckline or collar. The imaging device is connected to an image processor and the image processor identifies the region around the form collar and the garment neckline or collar and determines firstly that the garment is present, and then secondly that the garment neckline or collar is symmetrically placed in relation to the form collar markers, hence providing an indication of correct placement of the garment on the form pallet as well as its other main significant attributes.

Thus, embodiments may comprise a camera on the printer and detectable reference markers provided with markings at the feed side of the pallet, against which various methods are used to determine that the garment is fed correctly and symmetrically by the operator or by the grippers prior to and/or after placement on the pallet. Although the human eye is good at detecting asymmetries in the garment loading process, a human operator may miss some issues of the manually loaded garment due to fatigue and repetitive actions and also to the angle from which the pallet is generally viewed by the human operator.

The camera and the image processor may for example also be used for post printing, to determine the quality of the end result compared to the intended print; the faults that can be identified include, but not limited to: Print Placement, Wrong Side, Print Quality, Wrong image, Registration, White Spiking, Banding, Colors Bleeding, Distorted, Touched when wet, Ink coverage, Ink Drops, Lint/Debris, Incomplete Print, Head strike, Scattered image, Garment Quality, Wrong Garment, Fixation Stain, Factory Defect, Fold/Crease, Missing/Defective Tag, Scorched, Neck Tag.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
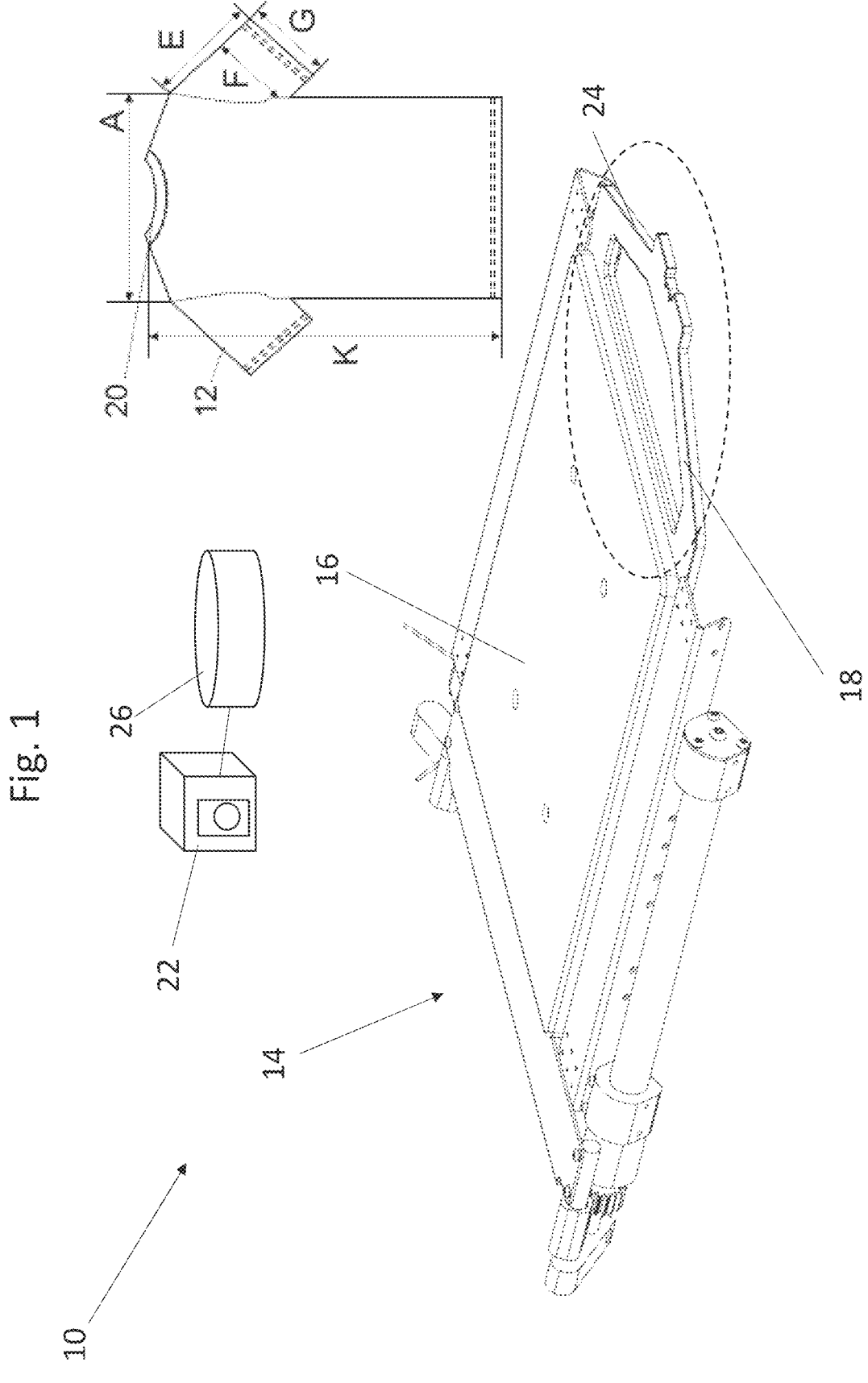
FIG. 1 is a simplified schematic drawing showing the pallet and imaging device of the palletization apparatus of the present embodiments and a garment for loading onto the pallet.

Referring now to the drawings, FIG. 1 illustrates palletization apparatus 10 and a garment 12 and the idea is to load garment 12 onto form pallet 14 for processing, for example printing. Apparatus 10 comprises the form pallet 14, which has an upper surface 16 against which the garment print surface is held. A form collar 18 allows for the neckline 20 or collar of the garment to be fitted on the form pallet.

An imaging device 22 is located relative to the pallet to have a view of the pallet as a whole or at least the region 24 around the form collar and marked by a dashed line. The imaging device may be a camera or a laser imaging device, including a LIDAR device. The camera may be with or without a lighting system. The imaging device is connected to image processor 26, which may be a dedicated computing device or may be part of the computerized control of a garment printing machine. The image processor 26 obtains images from the imaging device 22 and may specifically identify the region 24 around the form collar, which, after loading the garment 12 would be expected to have the garment neckline located symmetrically around the form collar, and, as will be discussed in greater detail below, marker signs may be placed on the pallet for improved discrimination between the garment and the background, as shown in greater detail in FIG. 15 below. The image processor may discover that the shirt is absent altogether, or may note that the neckline is not symmetrically placed over the form collar. Alternatively the image processor may discover that the neckline is indeed symmetrically placed around the form collar but the shape of the neckline indicates that the shirt has been placed backwards, inside out, or is otherwise not correctly orientated for the process. In all of these cases the image processor may issue an indication that something is wrong, so that the operator may take corrective action. In the case where the garment is held by grippers, there may be an option to adjust the grippers until the shirt is symmetrically placed. Alternatively, the image processor may correct the position and rotation of the print accordingly, as well as the height of the printheads, by means of software and correction algorithms, considering the actual placement of the garment as determined by the camera.

Thus the image processor may check for correct pallet configuration, the presence or absence of the garment on the pallet and also may ascertain that the garment is symmetrically placed. Thus the robot, and optionally the operator, may be provided with indications that the garment is correctly placed on the form pallet. The indications may be in the form of a green light, which turns red when a problem is noted, or may simply be implied by no adverse indication being issued or corrective action being taken. The automatic correction may be in the form of mechanical adjustment of the garment placement on the pallet or by means of software correction, as discussed above.

In an embodiment the printer or other process may be inhibited from operating until the problem is sorted out. An override or a direction to use another pallet may be provided to the operator, so that processing does not get stuck if the image processor malfunctions, etc.

Reference is now made to FIG. 2, which indicates operation of the image processor. The image processor may view the pallet—30—and then operates by identifying the neckline 32. The use of contrast agents or markers, including reflectors is discussed in greater detail in FIG. 15 below. If the pallet surface, including any markers thereon, are fully visible, and/or the neckline is not found then presumably the garment is absent and processing flows immediately to the negative outcome. If the neckline is found, then a high-definition image may be taken around the neckline or garment collar—34. The image processor then determines how the image is positioned in relation to the form collar—36, for example based on using the indicator referenced surfaces with known locations. If the markers are symmetric within a given tolerance around the form collar then processing is allowed to proceed—38. If the markers are not symmetric around the form collar then an adverse indication is issued for the operator to intervene, or corrective action, such as adjusting grippers or the image placement, is taken.

Referring now to FIG. 3, in addition to the above, or as an additional embodiment, the imaging device looks at and obtains an image of the entire pallet or more than one pallet at a time, depending on the field of view, from above—50. Separate imaging devices may obtain further views or illuminate the pallet from other angles. Images may be obtained both before and after the garment is loaded. The image taken may thus contain all the pallet portions of which the correctly configured pallet form is expected to be arranged and each pallet portion is uniquely marked by detectable markers such as light reflectors and thus can be explicitly identified for further processing. The image processor then compares the image obtained with various process parameters that are obtained—52—to determine—56—whether processing may proceed or whether an adverse indication should be issued to an operator or whether some form of corrective action may be taken by the machine controller. If the answer is yes then processing may proceed. The image processing parameters may be obtained from the machine controller, and may have to do with settings of the machine or with a particular processing program that is being used. For example, in the case of printing, the program being used may be for a specific type of garment, say a garment with long sleeves, and the pallet may be expected to be set up for long sleeves. Alternatively the garment may be a child's garment, so that the pallet may be expected to be set up for the smaller size.

The comparison may involve the design of the garment. Thus the parameters may relate to printing a tee-shirt. If a collar is spotted rather than a neckline, then the garment is clearly not a tee-shirt. Thus the image processor may compare the garment on the pallet to a predetermined configuration, to ensure a match between the garment and a predetermined processing program.

In printing the processing program typically includes a print map that is designed to be printed on a particular size and/or color and/or shape of garment. The image processor may thus be required to confirm that the garment on the pallet conforms with the given size and/or color and/or shape. In some cases the image processing may detect the sort of the fabric by identifying the knit or woven type and confirm the loaded garment is the correct garment and in the correct alignment. The garment may in some embodiments be provided with a tag carrying an identifying barcode, QR code or RFID. Image processing may also identify the unique ID of the garment by reading the attached tag with barcode, QR code, or a suitable reader may read the RFID tag.

Referring now to FIGS. 4A and 4B, a tee-shirt 70 is of a design suitable for children or for male adults. The basic shape of the garment shows it to be a tee-shirt, and measurements A-K may be determined by the image processor to obtain the size of the garment. FIGS. 4C and 4D show a tee-shirt for adult females, and measurements A-L may be used to determine the size of the garment. Thus the image processor is able to determine the design of the garment and the size and this may be checked against the printing parameters to ensure that the correct garment is being printed. The parameters for the processing program may define a given size of garment, and the particular manufacturer may specify size tolerances within any given size range. The image processor may thus be able to confirm that the garment on the pallet is of the given size within the manufacturer's tolerances.

Likewise the current configuration of the pallet may be checked to ensure that it matches with the garment. As well as the above, the garment details may be obtained from the tag on the garment if provided.

Referring now to FIG. 5, which is a flow chart of the overall loading and operation process, the pallet moves to the loading position—70. The pallet configuration is checked—72. Thus pallets may have exchangeable parts, such as mountings to accommodate the smaller sizes of children's clothes. The image processor may confirm the correctness of the current configuration or pallet size for the garment it is intended to process and if necessary, advise the operator upon misalignments or, in some cases, correct the problem automatically.

Then the garment is loaded manually by the operator, or automatically without an operator in the loop, onto the pallet—74, and the garment is imaged on the pallet to determine whether it is symmetrically placed, as discussed above—76. Other points and features may be checked at this point. Thus, certain printing processes require specific pre-printing operations. In one example, printing in color on a colored garment may require printing a white undercoat first before printing the colors. Accordingly if the processing program includes a pre-printing process with a white under-coat for color printing on a colored background, the image processor may be requested to confirm that the garment on the pallet is indeed colored as expected, and in turn verify that the white underlayer is printed correctly within the location and whiteness tolerances.

The printing, or other processing, program may be designed for a garment having a specified distribution of discontinuities within a print area, such as buttons, pockets, tabs, zippers, sewn-on tabs or protuberances etc., and the image processor may confirm the distribution of disconti-nuities, or may confirm that the processing area (printing area) of the garment is free of such discontinuities, or for that matter free of garment appendages such as sleeves, which may have inadvertently fallen across the printing area.

Likewise the image processor may ensure that that the processing area is free of folds or wrinkles by comparing the loaded garment image to a correct loading image as a reference. Alternatively, the image generator and processor may use dark-field technology with off-axis lighting that emphasizes the wrinkles over flat areas.

The operation, for example printing, is then carried out—78. The printing operation may be digital printing, say with inkjet technology, or it may be screen printing, or any other form of printing that is suitable for use with textiles and garments.

After printing the image full or partially, the image processor may compare garments with the print map to verify that the process has been applied successfully to the given garment. The print quality, including sharpness and color output may be checked, as well as making sure that the garment has not been damaged during the process.

Reference is now made to FIG. 6, which illustrates an image taken from the imaging device of the present embodi-ments. The neckline 90 of the garment 92 on the neck part 94 of the pallet is focused on, and a measurement is made in the image in pixels of the distances 96 and 98 of the edges of the garment neckline 90 from a marked position 100 on the pallet. The number of pixels is 222 on one side and 220 on the other, not exactly the same but symmetrical within the tolerances defined. It is noted that the tolerances may be varied as required.

FIG. 7 is the same as FIG. 6 but in this case the measurement shows an un-symmetrical loading position of the garment. Again, the image is taken from the imaging device of the present embodiments. The neckline 90 of the garment 92 on the neck part 94 of the pallet is again focused on, and a measurement is made in the image in pixels of the distances 96 and 98 of the edges of the garment neckline 90 from a marked position 100 on the pallet, just as before. The number of pixels is 173 on one side and 392 on the other, which is very far from symmetrical.

FIG. 8 is a simplified illustration of a laser scanning process that scans the garment according to embodiments of the present invention. Specifically, garment 92, which is placed on the pallet, is scanned across the neckline 90 by laser scan line 102.

FIG. 9 is a simplified diagram of an image formed after the laser scanning of FIG. 8. Image 104 is formed and the scan may give the position, state of symmetry and thickness of the scanned area.

Reference is now made to FIGS. 10A to 10C which are three views showing the use of contrast backgrounds on the pallet to assist the imaging with identification of the position of the garment. In FIG. 10A pallet 200 includes light reflector 202. In FIG. 10B, pallet 204 includes light reflec-tors 206 which contrasts with garment 207 which is seen to be symmetrically places. In FIG. 10C, pallet 208 includes light reflectors 210 which contrasts with garment 212 and which garment is seen to be incorrectly placed.

The contrast backgrounds or contrast markers in FIGS. 10A to 10C are shown positioned for collar detection and thus are around the collar area of the pallet.

Reference is now made to FIG. 11, which is a simplified diagram showing a pallet 220 made up of different pallet parts and with clear lines 222 between them, according to embodiments of the present invention. The lines may them-selves be made up of different colors, sizes of lines or patterns to make them easily distinguishable. The pallet parts and the clear lines may be used by the imaging to distinguish between the pallet and the garment.

Reference is now made to FIGS. 12A and 12B, which are simplified diagrams illustrating a further embodiment of a pallet 230 made up of different pallet parts. Light reflectors 232 are provided on the various parts, and the reflectors on the different parts are of different sizes or placed in different patterns, for example in twos, so that the imaging can identify the pallet parts.

Reference is now made to FIG. 13, which is a simplified view of a pallet 240 having parts 242, 244 and 246, which are provided with a checked pattern. The checked pattern provides contrast to assist the imaging in identifying the location of the garment as above. The size of the squares in the pattern may be varied to allow the different parts of the pallet to be distinguished.

Reference is now made to FIG. 14 which illustrates a camera positioned above the pallet according to embodi-ments of the present invention. As shown camera 250 is placed on an adjustable mount 251 on a digital printing machine or garment feeder or the like 252 above the pallet 254 and obtains a field of view 256 of the upper surface of the pallet and any garment that is placed thereon.

Reference is now made to FIG. 15, which is a simplified flow chart showing a variation of the process of identifying correct loading as shown in FIG. 2 above. The same refer-ence numerals are used for the same features. The image processor may view the pallet—30—with the garment placed thereon, and then operates by identifying the neck-line—32 using the contrast enhancers or markers, including any of the patterns and reflectors discussed herein. If the markers are fully visible, and/or the neckline is not found then presumably the garment is absent and processing flows immediately to the negative outcome. If the neckline is found, then a high-definition image may be taken around the neckline or garment collar—34. The image processor then determines how the image is positioned in relation to the form collar—36, for example based on using the indicator referenced surfaces with known locations. If the markers are symmetric within a given tolerance around the form collar then processing is allowed to proceed—38. If the markers are not symmetric around the form collar then an adverse indication is issued for the operator to intervene, or correc-tive action, such as adjusting grippers or the image place-ment, is taken.

Reference is now made to FIG. 16, which is a simplified diagram showing the flow chart of FIG. 3 modified to include the use of markers or other contrast features to identify the configuration of the pallet. The imaging device looks at and obtains an image of the entire pallet or more than one pallet at a time, depending on the field of view, from above—50. Contrast features such as light reflectors and patterns may indicate the pallet surface, and different patterns or sizes of patterns or contrast lines may indicate the different parts of the pallet. Separate imaging devices may obtain further views or illuminate the pallet from other angles. Images may be obtained both before and after the garment is loaded. The image taken may thus contain all the pallet portions of which the correctly configured pallet form is expected to be arranged and, as each pallet portion is uniquely marked by detectable markers such as light reflectors the separate portions may be identified for further processing. The image processor then compares the image obtained with various process parameters that are obtained—52—to determine—56—whether the pallet is correctly configured so that processing may proceed or whether an adverse indication should be issued to an operator or whether some form of corrective action may be taken by the machine controller. If the answer is yes then processing may proceed—58. The image processing parameters may be obtained from the machine controller, and may have to do with settings of the machine or with a particular processing program that is being used. For example, in the case of printing, the program being used may be for a specific type of garment, say a garment with long sleeves, and the pallet may be expected to be set up for long sleeves. Alternatively the garment may be a child's garment, so that the pallet may be expected to be set up for the smaller size.

It is expected that during the life of a patent maturing from this application many relevant garment processing, textile printing and imaging technologies will be developed and the scopes of these and other terms herein are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. Palletization apparatus for ensuring a correct loading of a garment having a neckline or a collar onto a pallet for processing, the apparatus comprising:
   a. a configurable pallet, the configurable pallet having an upper surface and a form collar, the form collar comprising at least one identification marker;
   b. an imaging device being located in relation to said configurable pallet to have a view of the configurable pallet, the view including one or more of a region around said form collar, said at least one identification marker and at least part of said garment;
   c. an image processor connected to said imaging device;
   wherein the image processor is configured for:
      i. identifying one or more of said region around said form collar, said at least one identification marker and said at least part of said garment;
      ii. assessing a placement of said garment neckline and/or said collar in relation to said form collar and said at least one identification marker;
      iii. providing an indication and/or corrective actions of correct placement of said garment on said configurable pallet thereby ensuring said correct loading of said garment.

2. The palletization apparatus of claim 1, wherein said image processor is configured to delimit a circle around said neckline or said garment collar and to determine how said circle is positioned in relation to said form collar and said at least one identification marker.

3. The palletization apparatus of claim 1, further comprising grippers for holding said garment and pulling said garment onto said configurable pallet, the grippers being controllable for adjustment of said garment to adjust said placement of said garment before or after loading the said garment.

4. The palletization apparatus of claim 1, wherein said image processor is further configured to compare a garment on said configurable pallet to a predetermined configuration, to ensure a match between the garment and/or said configurable pallet with data from a predetermined processing program.

5. The palletization apparatus of claim 4, wherein said predetermined processing data comprises a print map for a given size and/or color and/or shape and/or knit or woven type of garment and said image processor is configured to confirm that a garment on said configurable pallet conforms with said given size and/or color and/or shape and/or knit or woven type.

6. The palletization apparatus of claim 4, wherein said predetermined processing data comprises data for a pre-printing process for color printing on a colored background, and said image processor is configured to confirm that a garment on said configurable pallet is colored.

7. The palletization apparatus of claim 4, wherein said predetermined processing data is for a garment of a given size within preset manufacturer's tolerances, and said image processor is configured to confirm that a garment on said configurable pallet is of said given size within said manufacturer's tolerances.

8. The palletization apparatus of claim 4 wherein said predetermined processing data is designed for a garment having a specified distribution of discontinuities within a print area, and said image processor is configured to confirm that a garment on said configurable pallet conforms to the specified distribution of discontinuities.

9. The palletization apparatus of claim 4, wherein said configurable pallet is configurable or exchangeable for different garments and said image processor is configured to confirm that a current configuration or pallet size is compatible with said predetermined processing program.

10. The palletization apparatus of claim 4, wherein said image processor is configured to compare a neckline or garment collar to an expected neckline or garment collar to verify that a garment is orientated on said configurable pallet in accordance with said predetermined processing program, thereby to process an intended side of said garment.

11. The palletization apparatus of claim 4, wherein said image processor is configured to verify that a processing area of said garment is free of garment appendages.

12. The palletization apparatus of claim 4, wherein said image processor is configured to verify that a processing area of said garment is free of wrinkles.

13. The palletization apparatus of claim 4, wherein said image processor is configured to compare garments after partial or complete printing with data from a respective predetermined processing program to verify that said process has been applied successfully to a respective garment.

14. The palletization apparatus of claim 1, wherein the imaging device is one member of the group consisting of a camera, a laser and a LIDAR device.

15. The palletization apparatus of claim 1, wherein said at least one identification marker comprises contrast indicators to provide a contrast between the garment and said at least one surface.

16. The palletization apparatus of claim 15, wherein the contrast indicator is one member of the group consisting of: a geometrical pattern on said surface and light reflectors.

17. The palletization apparatus of claim 1, wherein said apparatus further comprises a laser imaging device configured to perform a laser scanning process that scans said garment, which allows to further perform said identifying.

18. The palletization apparatus of claim 1, wherein said corrective actions comprise one or more of correcting a configuration of said configurable pallet and a type of said garment.

19. Palletization method for ensuring a correct loading of a garment having a neckline or a collar onto a pallet for processing, the method using a configurable pallet comprising a form collar comprising at least one identification marker, the method comprising:

a. imaging the configurable pallet to take a view of the configurable pallet and determining that said garment is present in said view, the view including one or more of a region around said form collar, said at least one identification marker and at least part of said garment;

b. identifying from said view, one or more of said region around said form collar, said at least one identification marker and said at least part of said garment;

c. assessing a placement of said garment neckline and/or said collar in relation to said form collar and said at least one identification marker; and d. providing an indication and/or corrective actions of correct placement of said garment on said configurable pallet thereby ensuring said correct loading of said garment.

20. The palletization method of claim 19, comprising delimiting a circle around said neckline or garment collar and determining how said circle is positioned in relation to said form collar and said at least one identification marker.

21. The palletization method of claim 19, further comprising comparing a garment on said configurable pallet to a predetermined configuration, to ensure a match between the garment and data from a predetermined processing program.

22. The palletization method of claim 21, comprising verifying that a processing area of said garment is free of garment appendages or wrinkles.

23. The palletization method of claim 19, comprising comparing a garment on said configurable pallet to a preset size and/or color and/or shape and/or knit or woven type.

24. The palletization method of claim 23, wherein a predetermined process is for color printing on a colored background, the method comprising confirming that a garment on said configurable pallet is of a correct color.

25. The palletization method of claim 19, wherein a predetermined processing program is for a garment of a given size within preset manufacturer's tolerances, the method comprising confirming that a garment on said configurable pallet is of said given size within said manufacturer's tolerances, or wherein a predetermined processing program is designed for a garment having a specified distribution of discontinuities within a print area, the method comprising confirming that a garment on said pallet conforms to the specified distribution of discontinuities.

26. The palletization method of claim 19, comprising determining an orientation of the garment on the configurable pallet, or using grippers to realign the garment.

\* \* \* \* \*